United States Patent [19]

Cheung et al.

[11] Patent Number: 5,360,779
[45] Date of Patent: Nov. 1, 1994

[54] PREPARATION OF SUPPORTED SULFUR COMPOSITIONS

[75] Inventors: Tin-Tack P. Cheung; Marvin M. Johnson, both of Bartlesville, Okla.

[73] Assignee: Phillips Petroleum Company, Bartlesville, Okla.

[21] Appl. No.: 137,249

[22] Filed: Oct. 14, 1993

[51] Int. Cl.$^5$ .................... B01J 20/08; B01J 20/10; B01J 20/20; B01D 53/14
[52] U.S. Cl. .................... 502/415; 423/245.1; 502/400; 502/407; 502/417
[58] Field of Search .................... 502/400, 415, 216

[56] References Cited

U.S. PATENT DOCUMENTS

| | | | |
|---|---|---|---|
| 4,943,547 | 7/1990 | Seamans et al. | 502/220 |
| 5,041,404 | 8/1991 | Seamans et al. | 502/220 |
| 5,085,844 | 2/1992 | Nowack et al. | 423/245.1 |
| 5,215,954 | 6/1993 | Seamans et al. | 502/216 |

*Primary Examiner*—Paul E. Konopka
*Attorney, Agent, or Firm*—K. K. Brandes

[57] ABSTRACT

A solid combination of elemental sulfur and an inorganic support material (preferably alumina), is contacted with at least one liquid $C_5$–$C_{12}$ alkane and/or cycloalkane, followed by substantially removing the $C_5$–$C_{12}$ hydrocarbon from the thus-contacted solid combination of elemental sulfur and inorganic support. This process improves the trialkyl arsine absorption capacity of the solid combination.

13 Claims, No Drawings

PREPARATION OF SUPPORTED SULFUR COMPOSITIONS

BACKGROUND OF THE INVENTION

Supported sulfur compositions, such as alumina which has been impregnated with liquid elemental sulfur, are effective trialkyl arsine sorbents. These materials and their use as trialkyl arsine sorbents have been described in U.S. Pat. No. 5,085,844. The present invention is directed to an improved method of making supported sulfur compositions which exhibit enhanced trialkyl arsine sorption capacity.

SUMMARY OF THE INVENTION

It is an object of this invention to provide an improved process for preparing supported sulfur compositions which are effective as trialkyl arsine sorbents. Particular objects and advantages of this invention will become apparent from the detailed description and the appended claims.

In a process for preparing a supported elemental sulfur composition, the improvement comprises contacting a solid combination of elemental sulfur and an inorganic support material with at least one liquid hydrocarbon containing 5-12 carbon atoms per molecule selected from the group of alkanes and cycloalkanes for a period of time of at least about 10 minutes, and then substantially removing the liquid hydrocarbon(s) from the thus-contacted solid combination.

Preferably, the inorganic support material is alumina. It is presently preferred to employ a solid combination consisting essentially of elemental sulfur and inorganic support material, in particular wherein the solid combination has been prepared by impregnating the inorganic support material (preferably alumina) with molten elemental sulfur at a temperature above the melting point of elemental sulfur, and then lowering the temperature below the melting point of elemental sulfur so as to afford solidification of the elemental sulfur on the inorganic support material.

DETAILED DESCRIPTION OF THE INVENTION

Any suitable, effective inorganic support material can be employed as the support (carrier) component of the starting material (i.e., the solid combination of elemental sulfur and an inorganic support material which is to be treated with the liquid hydrocarbon in accordance with the process of this invention). Preferably, the support material is selected from the group consisting of alumina, fluorided alumina (i.e., alumina which has been treated with HF or $NH_4HF_2$ under conditions as to incorporate fluoride ions into the crystal lattice of alumina), aluminum phosphate, magnesia (MgO), silica, titania ($TiO_2$), zirconia ($ZrO_2$), hafnia ($Hf)_2$), zinc oxide, zinc aluminate ($ZnAl_2O_4$), aluminates of alkaline earth metals (i.e., of Be, Mg, Ca, Sr, Ba), zinc titanate ($Zn_2TiO_4$), titantes of alkaline earth metals, activated carbon, and mixtures of two or more than two of the above materials. Presently more preferred support materials are alumina, silica, titania, activated carbon, and mixtures of two or more of these materials. Particularly preferred is alumina.

The elemental sulfur component can be combined with the inorganic support material in any suitable manner, such as by impregnating or spraying the support material with a solution of sulfur (e.g., in carbon disulfide or another effective solvent for sulfur), followed by drying of the obtained sulfur-containing material; or by impregnating the support material with molten sulfur, followed by cooling below the melting temperature of sulfur; or by subliming the sulfur onto the support material; or by depositing Fe(III) sulfide ($Fe_2S_3$) or at least one polysulfide of a transition metal, such as Mn, Fe, Co, Ni, Cu, or mixtures thereof, preferably $Fe_2(S_3)_3$, on the support material, and then at least partially converting the transition metal polysulfide to elemental sulfur, preferably by reaction with a free oxygen containing gas (e.g., air). It is within the scope of this invention to use as the starting material a "spent" Claus catalyst, i.e., an alumina material which has been used in a process for oxidatively converting $H_2S$ to elemental sulfur (either in a direct one-step oxidation step process, or in a two-step process via oxidation of a portion of $H_2S$ to $SO_2$ and subsequent reaction of $SO_2$ with another portion of $H_2S$ to form elemental sulfur.

Generally, the sulfur content in the starting material (to be treated with liquid hydrocarbon in accordance with this invention) is in the range of from about 1 to about 50, preferably from about 3 to about 25, weight-% elemental S. It is within the scope of this invention to have, in addition to elemental sulfur, metal oxides and/or metal-sulfur compounds (such as Fe(III) oxide and/or sulfite and/or sulfate or the corresponding compounds of Co and/or Ni and/or Mn) present in the starting material.

The starting material for the process of this invention (i.e., the supported elemental sulfur composition) can have any suitable surface area (preferably about 10-1000 $m^2/g$, as measured by the B.E.T. method employing $N_2$), any suitable shape (such as spherical, cylindrical, ring-shaped, trilobal, etc.), and any suitable particle size (such as about 0.2-20 mm diameter of spherical particles).

Any suitable liquid $C_5$-$C_{12}$ hydrocarbon can be employed in the improved preparation method of this invention. Non-limiting examples include (but are not limited) to n-pentane, isopentanes (i.e., branched pentanes), n-hexane, isohexanes, n-octane, isooctanes, n-nonane, isononanes, n-decane, isodecanes, n-undecanes, isoundecanes, n-dodecane, isododecanes, cyclopentane, cyclohexane, cycloheptane, methyl-substituted cyclopentane, methyl-substituted cyclohexanes, methyl-substituted cycloheptane, dimethyl-substituted cyclopentanes, dimethyl-substituted cyclohexane, dimethyl-substituted cycloheptanes, ethyl-substituted cyclopentane, ethyl-substituted cyclohexane, ethyl-substituted cyclopentane, trimethyl-substituted cyclopentanes, trimethyl-substituted cyclohexanes, trimethyl-substituted cycloheptanes, methyl,ethyl-substituted cyclopentane, methyl,ethyl-substituted cyclohexanes, methyl,ethyl-substituted cycloheptanes, and mixtures of two or more than two of any of the above-listed hydrocarbons, including gasoline. Presently preferred are hydrocarbons containing 6-9 carbon atoms per molecule. Presently more preferred are n-octane and cyclohexane.

The contacting of the starting material (i.e., the solid combination of elemental sulfur and inorganic material) with at least one hydrocarbon can be carried out at any suitable conditions (so as to afford an increase in trialkyl arsine sorption capacity). Preferably, the contacting conditions comprise a temperature of about 10° C. to 35° C. and a time period of about 0.5 to about 2 hours. Preferably, the contacting is carried out by submersing the solid material in the liquid hydrocarbon, with or without mechanical agitation. In other contacting mode, the hydrocarbon liquid is slowly passed through a column containing the solid material.

The removal of the hydrocarbon(s) from the thus-contacted solid combination of elemental sulfur and inorganic support material can be carried out by any suitable technique. Generally, the mixture of the thus-contacted solid combination and hydrocarbon(s) is dried at any atmosphere or under vacuum conditions, so as to remove substantially all adhered hydrocarbon(s) from the supported sulfur composition. Optionally, a major portion of the hydrocarbon(s) is removed before the drying by any suitable liquid-solid separation technique, such as by decanting of the liquid or by filtering or by centrifuging.

The following example is provided to further illustrate this invention and is not to be construed as unduly limiting the scope of this invention.

EXAMPLE I

This example illustrates the soaking of sulfur/alumina sorbent materials with various organic liquids and the effect of this treatment on the trimethyl arsine absorption capacity of these sorbent materials.

Sorbent A (Control) is the untreated $S/Al_2O_4$ base material. It was prepared by adding, during a period of 5–15 minutes with agitation, 11 lb of elemental sulfur to 100 lb of ⅛" alumina particles (S-201, provided by La Roche Chemicals, Baton Rouge, La.; calcined for about 6 hours at 662° F.) in a ribbon blender at a temperature of 320°–380° F. The mixing in the ribbon blender was continued for 5–10 minutes. Thereafter, the sulfur-impregnated alumina particles were heated for at least 2 hours at 310° F. During this heat-soaking step, the blender was turned on every 15 minutes for about 10 seconds in one direction and for another 10 seconds in the opposite direction. Sorbent A contained about 8.5 weight-%.

Sorbent A1 (Control) was essentially the same as Sorbent A, except that the sulfur content was about 10 weight-%.

Sorbent B (Invention) was prepared by submersing 10 cc of Sorbent A at room temperature in about 50 cc of n-octane for 1.5 hours. The soaked material was dried and the sieved through a 10 mesh screen to remove fines.

Sorbent C (Invention) was prepared essentially in accordance with the procedure for Sorbent B, except that Sorbent A1 and cyclohexane were used (in lieu of Sorbent A and n-octane).

Sorbent D (Control) was prepared essentially in accordance with the procedure for Sorbent B, except that Sorbent A1 and toluene were used (in lieu of Sorbent A and n-octane).

Sorbent E (Control) was prepared essentially in accordance with the procedure for Sorbent B, except that a 50/50 ethanol/water mixture was used (in lieu of n-octane).

Sorbent A–E were tested for trimethyl arsine (TMA) absorption, essentially in accordance with the procedure described in Example I of U.S. Pat. No. 5,085,844, except that the gas hourly space velocity of the feed was about 2,000 cc/cc sorbent/hour. Trimethyl arsine absorption at breakthrough attained with Sorbents A–E are summarized in Table I.

TABLE I

| Sorbent | Contacting Agent | Wt. % As in Sorbent at TMA Breakthrough |
| --- | --- | --- |
| A (Control) | None | 1.3 |
| A (Control) | None | 1.0 |
| A1 (Control) | None | 1.8 |
| B (Invention) | n-Octane | 2.4 |
| C (Invention) | Cyclohexane | 2.3 |
| D (Control) | Toluene | 1.0 |
| E (Control) | Ethanol/Water | 0.7 |

Test data in Table I clearly show the beneficial effect of soaking sulfur/alumina with n-octane and cyclohexane, respectively, whereas no benefit was achieved by soaking in two other organic solvents (outside the scope of this invention).

Reasonable variation, modifications and adaptations for various conditions and reactants can be made within the scope of the disclosure and the appended claims without departing from the scope of this invention.

We claim:

1. In a process for preparing a supported elemental sulfur composition which is effective as a trimethylarsine sorbent, the improvement which comprises contacting, for a period of at least 10 minutes, (a) a starting material which is a solid combination of elemental sulfur and alumina, said solid combination consisting essentially of about 1 to about 50 weight-% solid elemental sulfur and alumina which supports said solid elemental sulfur, with (b) a liquid consisting essentially of at least one liquid hydrocarbon containing 5–12 carbon atoms per molecule and being selected from the group consisting of alkanes and cycloalkanes, and thereafter drying the formed mixture of the thus-contacted solid combination and said at least one liquid hydrocarbon thereby removing said at least one liquid hydrocarbon from the thus-contacted solid combination.

2. A process in accordance with claim 1, wherein the elemental sulfur content in said solid combination is about 3–25 weight-% S.

3. A process in accordance with claim 1, wherein said solid combination has been prepared by impregnating alumina with molten elemental sulfur at a temperature above the melting point of elemental sulfur, and then lowering the temperature below the melting point of elemental sulfur so as to afford solidification of elemental sulfur on alumina.

4. A process in accordance with claim 1, wherein said at least one liquid hydrocarbon contains about 6–9 carbon atoms per molecule.

5. A process in accordance with claim 1, wherein said solid combination contains 3–25 weight-% elemental sulfur and alumina, and said at least one liquid hydrocarbon is selected from the group consisting of n-octane and cyclohexane.

6. A process in accordance with claim 1, wherein said contacting is carried out for a period of time of about 0.5–2 hours, at a temperature of about 10°–35° C.

7. A process in accordance with claim 9, wherein said contacting comprises submersing said solid combination in said at least one liquid hydrocarbon.

8. A process in accordance with claim 1, wherein said drying is carried out at a temperature of about 20°–120° C.

9. A process in accordance with claim 1, wherein prior to said drying, a major portion of said at least one liquid hydrocarbon is removed from said mixture by a solid-liquid separation technique selected from the group consisting of decanting, filtering and centrifuging.

10. A process in accordance with claim 1, wherein said starting material has a surface area of about 10–1000 $m^2/g$, a spherical shape, and a particle size of about 0.2–20 mm.

11. A process in accordance with claim 1, wherein said contacting comprises passing said at least one liquid hydrocarbon through a column containing said starting material.

12. A process in accordance with claim 1, wherein said drying is carried out in a nitrogen atmosphere.

13. A process in accordance with claim 1, wherein said drying is carried out under vacuum conditions.

* * * * *

UNITED STATES PATENT AND TRADEMARK OFFICE
CERTIFICATE OF CORRECTION

PATENT NO. : 5,360,779

DATED : November 1, 1994

INVENTOR(S) : Tin-Tack Peter Cheung et al

It is certified that error appears in the above-indentified patent and that said Letters Patent is hereby corrected as shown below:

Claim 7, column 4, line 66, delete "9" after "claim" and insert --- 6 --- therefor.

Signed and Sealed this

Thirty-first Day of January, 1995

Attest:

BRUCE LEHMAN

Attesting Officer

Commissioner of Patents and Trademarks